United States Patent [19]

Lisco

[11] Patent Number: 5,146,079
[45] Date of Patent: Sep. 8, 1992

[54] BROADBAND OPTICAL RECEIVER WITH ACTIVE BIAS FEEDBACK CIRCUIT

[75] Inventor: Richard J. Lisco, Township of Hanover, Morris County, N.J.

[73] Assignee: AT&T Bell Laboratories, Murray Hill, N.J.

[21] Appl. No.: 608,085

[22] Filed: Nov. 1, 1990

[51] Int. Cl.⁵ .............................................. H01J 40/14
[52] U.S. Cl. ............................. 250/214 AG; 330/116
[58] Field of Search ....... 250/214 A, 214 C, 214 AG; 455/619, 617, 131; 307/311; 330/11 G; 359/154, 180, 194

[56] References Cited

U.S. PATENT DOCUMENTS

| | | | |
|---|---|---|---|
| 3,714,597 | 1/1973 | Reynolds | 330/116 |
| 4,574,249 | 3/1986 | Williams | 455/619 |
| 4,792,987 | 12/1988 | Tumeo | 455/131 |
| 4,798,950 | 1/1989 | Hosoda et al. | 250/214 A |

*Primary Examiner*—David C. Nelms
*Assistant Examiner*—Que T. Le
*Attorney, Agent, or Firm*—L. H. Birnbaum

[57] ABSTRACT

A broadband optical receiver which exhibits low noise and distortion characteristics. An active bias feedback circuit stabilizes the quiescent operating currents of a low noise amplifier coupled to the receiver photodetector. A transformer matches the impedance of the amplifier to an attenuator.

9 Claims, 2 Drawing Sheets

BROADBAND OPTICAL RECEIVER WITH ACTIVE BIAS FEEDBACK CIRCUIT

BACKGROUND OF THE INVENTION

This invention relates to optical receivers.

In Fiber-To-The-Home systems, information is sent optically from a central office terminal to a remote terminal and then to a distant terminal which is typically located at a curb or mounted on a pole for serving several subscribers or, eventually, could be located at the customer's premises. An optical receiver is located at each terminal to convert the optical signal to an electrical signal and amplify the signal so that the signal can be transmitted on a coaxial cable to the customer.

In broadband analog IM (Intensity Modulation) systems, carrier frequencies typically range from 40 MHz to 600 MHz. In such systems, linear amplification, noise and signal distortions are significant problems. For example, impedance matching of the low noise amplifier of the receiver circuit with succeeding stages to which it is coupled should be accomplished without adding noise and distortion. Conventional emitter followers used for impedance matching, however, degrade linearity. Further, because linearity and noise are bias-dependent parameters of the active amplifying devices (e.g., transistors), it becomes increasingly important to maintain the optimum quiescent operating conditions for the receiver active devices.

It is, therefore, an object of the invention to provide an optical receiver with low noise and distortion characteristics. It is a further object to provide a receiver where the optimum operating conditions are set and maintained by an active bias circuit which continually adjusts the amplifier circuit bias to compensate for device aging, initial tolerances, temperatures, and the changing DC input current, produced by the optical signal.

SUMMARY OF THE INVENTION

This and other objects are achieved in accordance with the invention, which is an optical receiver comprising a photodetector device and an amplifier coupled to an output of the photodetector. An active feedback bias control circuit is coupled between the input and output of the amplifier. A transformer is also coupled to the output of the amplifier for impedance matching the amplifier output with other components coupled to the amplifier.

BRIEF DESCRIPTION OF THE DRAWING

These and other features of the invention are delineated in detail in the following description. In the drawing.

DETAILED DESCRIPTION

Figure 1:
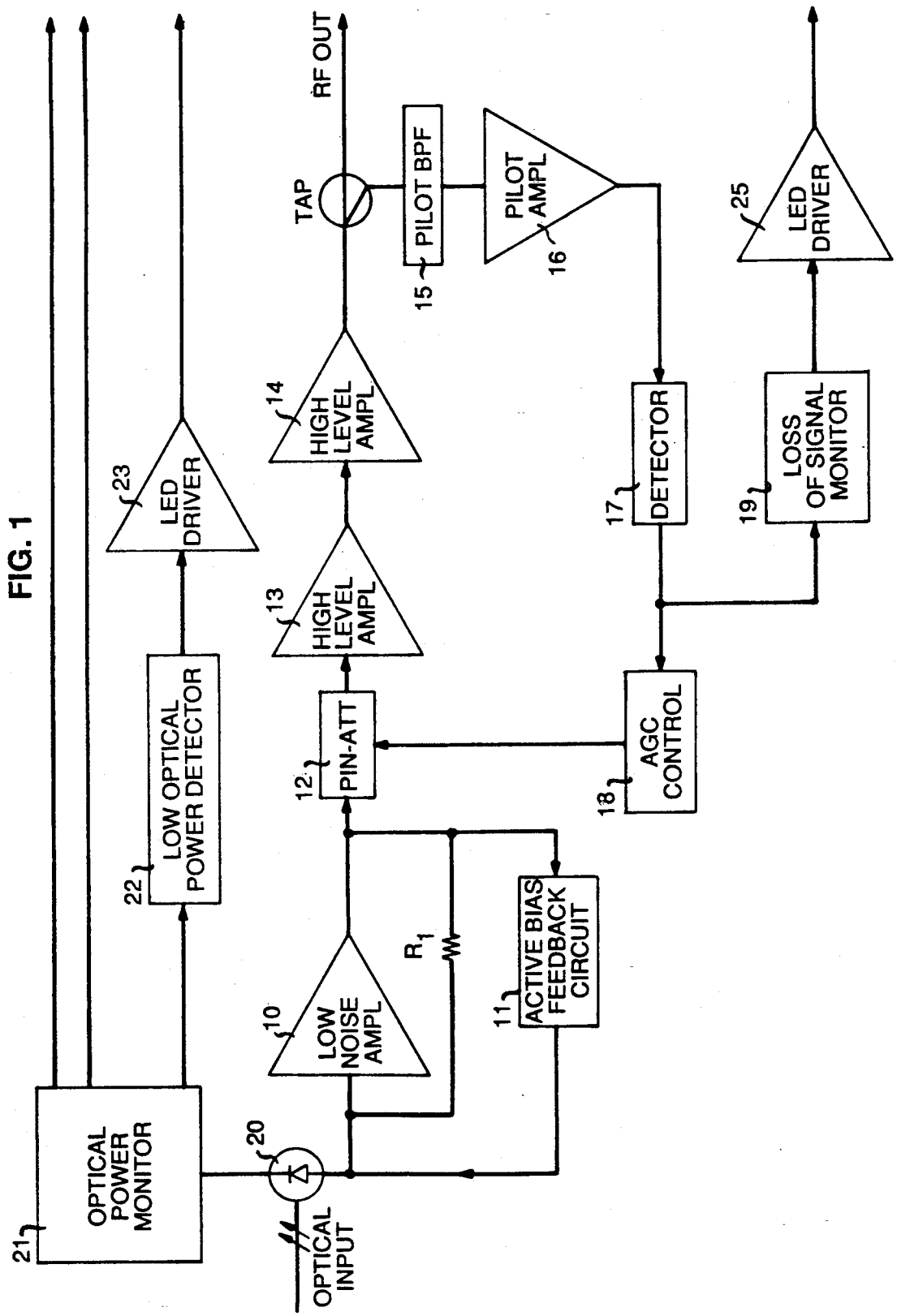
FIG. 1 is a block diagram of a typical broadband optical receiver utilizing features in accordance with an embodiment of the invention.

FIG. 1 is a block diagram of an optical receiver which can be utilized in any optical analog IM system, including Fiber-To-The-Home systems. The optical input is applied to a photodetector device, 20, which is a PIN diode having high linearity and responsivity to minimize distortion and maximize signal-to-noise ratio. The resulting electrical output of the PIN device has an AC and a DC component. The AC component is coupled to the input of a low noise transimpedance amplifier 10 where the signal current is converted to a signal voltage proportional thereto and resistor $R_1$ provides feedback control for the carrier frequencies. A DC feedback path is provided by the active bias feedback circuit 11 in order to control the bias to the amplifier.

The output of the amplifier, 10, is coupled to a PIN attenuator, 12, which serves to maintain a constant amplified RF output signal as described below. The output of the attenuator is coupled through amplifiers 13 and 14 to RF Out which is a coaxial connection providing service to one or more customers. At the TAP, a bandpass filter, 15, picks off the pilot signal sent by the remote terminal. This pilot signal is then amplified by amplifier 16, and the resulting AC signal is converted to DC by a peak detector 17. At the automatic gain control, 18 the output of the peak detector is compared with a reference voltage (not shown), and the resulting output of the control adjusts the attenuation provided by attenuator 12 in order to keep the signal at RF Out at a constant amplitude. If the signal from detector 17 falls below a predetermined level, the loss of signal monitor, 19, will provide a signal to LED driver 25 to operate an alarm (not shown).

The DC component from the photodiode 20, is also coupled to the optical power monitor, 21, for measuring the amplitude of the optical signal. The voltage generated at the output of the monitor is detected by the low optical power detector 22 and compared with a predetermined threshold. If the power falls below the threshold, a signal is fed to LED driver 23 to activate an alarm (not shown).

Figure 2:
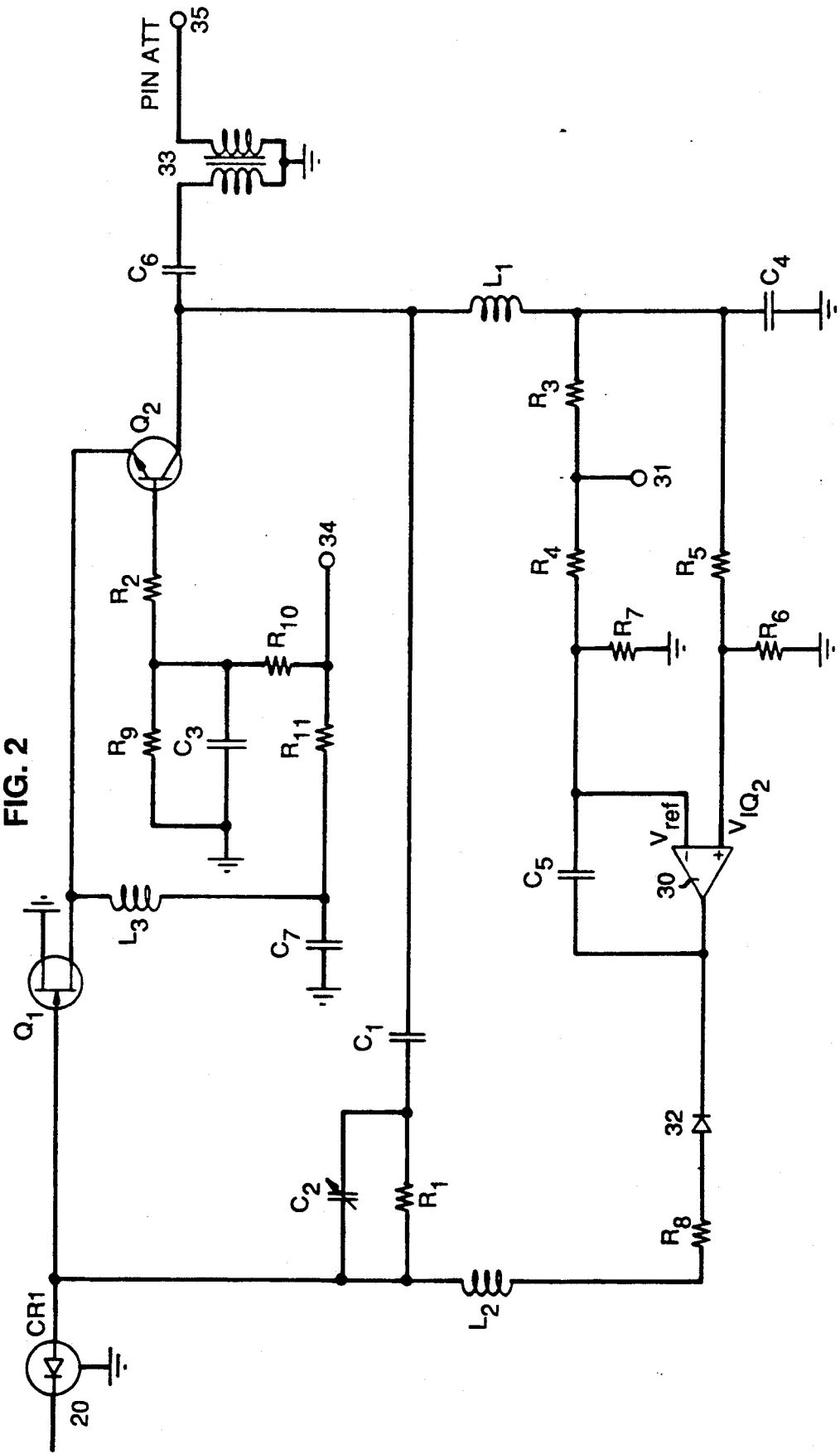
FIG. 2 is a schematic circuit diagram of the front-end portion of the optical receiver of FIG. 1 illustrating features of the invention in accordance with the same embodiment.

FIG. 2 illustrates in more detail the low noise amplifier and active feedback circuit portions of the receiver of FIG. 1. The circuit is configured as a direct coupled cascode amplifier. The low noise amplifier includes a field effect transistor (FET) $Q_1$ and a bipolar transistor $Q_2$ whose emitter is directly coupled to the drain of the FET. The source of the FET is grounded. The collector of $Q_2$ is coupled to the non-inverting (positive) input of the operational amplifier, 30, through the voltage divider formed by resistors $R_5$ and $R_6$. A constant bias at terminal 31, in this example 16 volts, and the voltage divider formed by resistors $R_4$ and $R_7$ establish a reference voltage, $V_{ref}$, at the inverting input of the operational amplifier. A capacitor $C_5$ is coupled in a feedback relationship between the output of the operational amplifier 30 and the inverting input.

The output of the operational amplifier is coupled through diode 32, resistor $R_8$, and inductor $L_2$ to the gate of transistor $Q_1$ and the anode of photodiode 20. Also coupled to the gate of $Q_1$ is a parallel arrangement of feedback resistor $R_1$ and variable capacitor $C_2$ in series with a capacitor $C_1$ which is coupled to the collector of transistor $Q_2$.

The base of transistor $Q_2$ is biased by a constant voltage determined by a source of 16 volts applied at terminal 34 through the voltage divider formed by resistors $R_9$ and $R_{10}$ and through resistor $R_2$ which enhances AC stability. Also coupled to the collector of transistor $Q_2$ is a capacitor $C_6$, and the primary winding of a transformer 33. The secondary winding of the transformer is coupled to terminal 35 which is coupled to the PIN attenuator (12 of FIG. 1).

In operation, the combination of transistors $Q_1$ and $Q_2$, in conjunction with resistor $R_1$, forms a transimpedance amplifier which amplifies the signal current from photodiode 20 and provides an output voltage signal to the PIN attenuator through capacitor $C_6$ and transformer 33. The capacitor $C_6$ provides DC blocking of the voltage from terminal 31. The transformer 33 matches the impedance of the amplifier with the PIN attenuator. In this example, the transformer presents approximately 150 ohms impedance to the amplifier. The use of a broadband RF transformer for impedance matching, rather than the standard emitter follower circuit, will produce lower signal distortions (i.e., approximately 20 dB improvement). In this example, a 2:1 impedance ratio was selected to satisfy the bandwidth, carrier-to-noise, and power gain requirements. The particular transformer employed was a broadband RF transformer sold by Minicircuits under the designation T2-1-KK81.

Bias of the low noise amplifier is controlled by operational amplifier 30 since the voltage developed across $R_3$ is a measure of the collector current of $Q_2$, and this voltage will be established through the voltage divider of $R_5$–$R_6$ at the plus (+) input of the op amp where it ($V_{IQ2}$) will be compared with the $V_{ref}$ at the minus (−) input. Therefore, by virtue of the feedback connection and the gain of amplifier 30, the difference between $V_{ref}$ at the minus (−) input and $V_{IQ2}$ at the plus (+) input will be minimal, thereby maintaining a constant $Q_2$ collector current. For example, if the collector current of $Q_2$ is low, the voltage of the plus (+) input will be high (more positive) relative to $V_{ref}$. The output of the op amp will then drive the gate of $Q_1$ less negative to increase the FET channel conduction and thereby draw more current out of the emitter of $Q_2$. As current is drawn from $Q_2$, the voltage drop across $R_3$ will increase until the two inputs to op amp 30 are equal and the output of the op amp reaches a quiescent state. Similarly, if the collector current of $Q_2$ is high, the voltage of the plus (+) input will be less positive relative to $V_{ref}$ and the output of the op amp will drive the gate of $Q_1$ more negative. As less current is drawn through $Q_2$ the voltage drop across $R_3$ will decrease until, again, both inputs are equal. The collector current of $Q_2$ is, therefore, kept constant. Also, since the drain current of $Q_1$ is composed of the emitter current of $Q_2$ and a fixed current through $R_{11}$, the drain current of $Q_1$ is also controlled.

To achieve low-noise performance, FET $Q_1$ should have low gate leakage current ($<1$ uA), low gate-to-source capacitance ($<1.5$ pF), and a high ratio of transconductance (gm) to gate-to-source capacitance (Cgs) figure of merit ($>100$ milli-Siemens/pF). Further, since the transresistance ($R_1$) contributes directly to the total input noise current, this resistor should be as large as permitted by the receiver bandwidth requirement. Typical values range from 500 ohms to 2000 ohms.

To provide wide dynamic range and exceptional linearity, it is desirable that transistor $Q_2$ have high power handling capability and high associated second and third order intercept points. The transistors selected has an output power compression point ($P_{1dB}$) of +29 dBm, and the point where the projected third order intermodulation distortion intercepts the power gain curve is +37 dBm.

With the parameters described above, receiver circuits were able to achieve an input noise current of 5 picoamps per $\sqrt{Hz}$ or less (measured at 100 MHz frequency), and a bandwidth greater than 540 MHz. The front-end intercepts were +25 dBm and +55 dBm or higher for the second and third order distortions, respectively.

Utilization of two independent feedback paths (provided by $R_1$ and op amp 30) results in optimum AC performance and DC stability. The active bias control circuit assures that optimum bias conditions are maintained in spite of device tolerance, aging, and temperature variations. The same control circuit compensates for DC bias shifts produced by variations in the received optical power level.

Various modifications of the invention will become apparent to those skilled in the art. All such variations which basically rely on the teachings through which the invention has advanced the art are properly considered within the scope of the invention.

I claim:

1. An optical receiver comprising:
   a photodetector device having an output;
   an amplifier having an input coupled to the output of the photodetector device, and having an output, the amplifier comprising a field effect transistor coupled to a bipolar transistor; and
   an active feedback bias control circuit coupled between the input and output of the amplifier,
   said bias control circuit comprising means for sensing current through the bipolar transistor and means in response thereto for adjusting the bias to the gate of the field effect transistor to keep the current through the bipolar transistor constant.

2. The device according to claim 1 further comprising a transformer coupled to the output of the amplifier and an attenuator coupled to the amplifier output through the transformer.

3. The device according to claim 2 wherein the impedance ratio of the transformer is approximately 2:1.

4. The device according to claim 2 wherein the transformer is coupled to the amplifier through a capacitor.

5. The device according to claim 1 wherein an AC feedback resistor is coupled between the input and output of the amplifier and the resistance is within the range 500 ohms to 2000 ohms.

6. The device according to claim 1 wherein the bandwidth is at least 540 MHz.

7. The device according to claim 1 wherein the noise input current at 100 MHz is no greater than 5 picoamps per $\sqrt{Hz}$.

8. The device according to claim 1 wherein the intercept points for the second and third order distortions are at least +25 dBm and +55 dBm, respectively.

9. The device according to claim 1 wherein the active feedback bias control circuit comprises an operational amplifier with one input coupled to the collector of the bipolar transistor, another input adapted for providing a reference voltage, and an output coupled to the gate of the FET.

* * * * *